Aug. 8, 1950 J. L. GIOVANNUCCI ET AL 2,518,232

MECHANISM FOR CENTRALIZING AND CLAMPING PHONOGRAPH DISK RECORDS

Filed Feb. 26, 1945 3 Sheets-Sheet 1

INVENTORS
JULIUS L. GIOVANNUCCI
JOHN WERBISKAS
DONALD F. BALMER

BY H. G. Manning

ATTORNEY

INVENTORS
JULIUS L. GIOVANNUCCI
JOHN WERBISKAS
DONALD F. BALMER
BY H. G. Manning
ATTORNEY INVENTORS
JULIUS L. GIOVANNUCCI
JOHN WERBISKAS
DONALD F. BALMER
BY H. G. Manning
ATTORNEY Patented Aug. 8, 1950 | 2,518,232

UNITED STATES PATENT OFFICE 2,518,232

MECHANISM FOR CENTRALIZING AND CLAMPING PHONOGRAPH DISK RECORDS

Julius L. Giovannucci, North Haven, and John Werbiskas and Donald F. Balmer, New Haven, Conn., assignors to The Soundscriber Corporation, New Haven, Conn., a corporation of Connecticut Application February 26, 1945, Serial No. 579,862

14 Claims. (Cl. 274—9)

This invention relates to sound recording and reproducing, and more particularly to an improved apparatus for automatically centralizing a phonograph disk record upon a turntable and clamping it securely thereto.

One object of the present invention is to provide an apparatus of the above nature which may be manipulated by a single operating handle located conveniently at the forward part of the apparatus.

A further object is to provide an apparatus of the above nature in which a sliding cam is connected with the operating handle for simultaneously closing a switch for starting the turntable, lowering the disk record upon the turntable, and releasing a spring for clamping the record upon said turntable, whenever said handle is pushed inwardly.

A further object is to provide an apparatus of the above nature which is adapted to operate on a thin apertured disk phonograph record, and having means to provide an effective driving connection between the record and the turntable regardless of the shape of the aperture in said record.

A further object is to provide an apparatus of the above nature in which it will be unnecessary for the operator to accurately locate the disk record upon the turntable—the centralizing operation being performed automatically by the action of pushing in the operating handle.

A further object is to provide an apparatus of the above nature in which the turntable shell will be automatically stopped to permit manual removal of the record whenever the operating handle is pulled out.

A further object is to provide an apparatus of the above nature in which means are provided for automatically raising the recording head from the record whenever the operating handle is pulled out to permit the record to be reversed or replaced.

A further object is to provide an apparatus of the above nature which will be simple in construction, inexpensive to manufacture, easy to install and manipulate, compact, ornamental in appearance, and very efficient and durable in use.

With these and other objects in view, there has been illustrated on the accompanying drawings one form in which the invention may conveniently be embodied in practice.

Figures 1, 2:
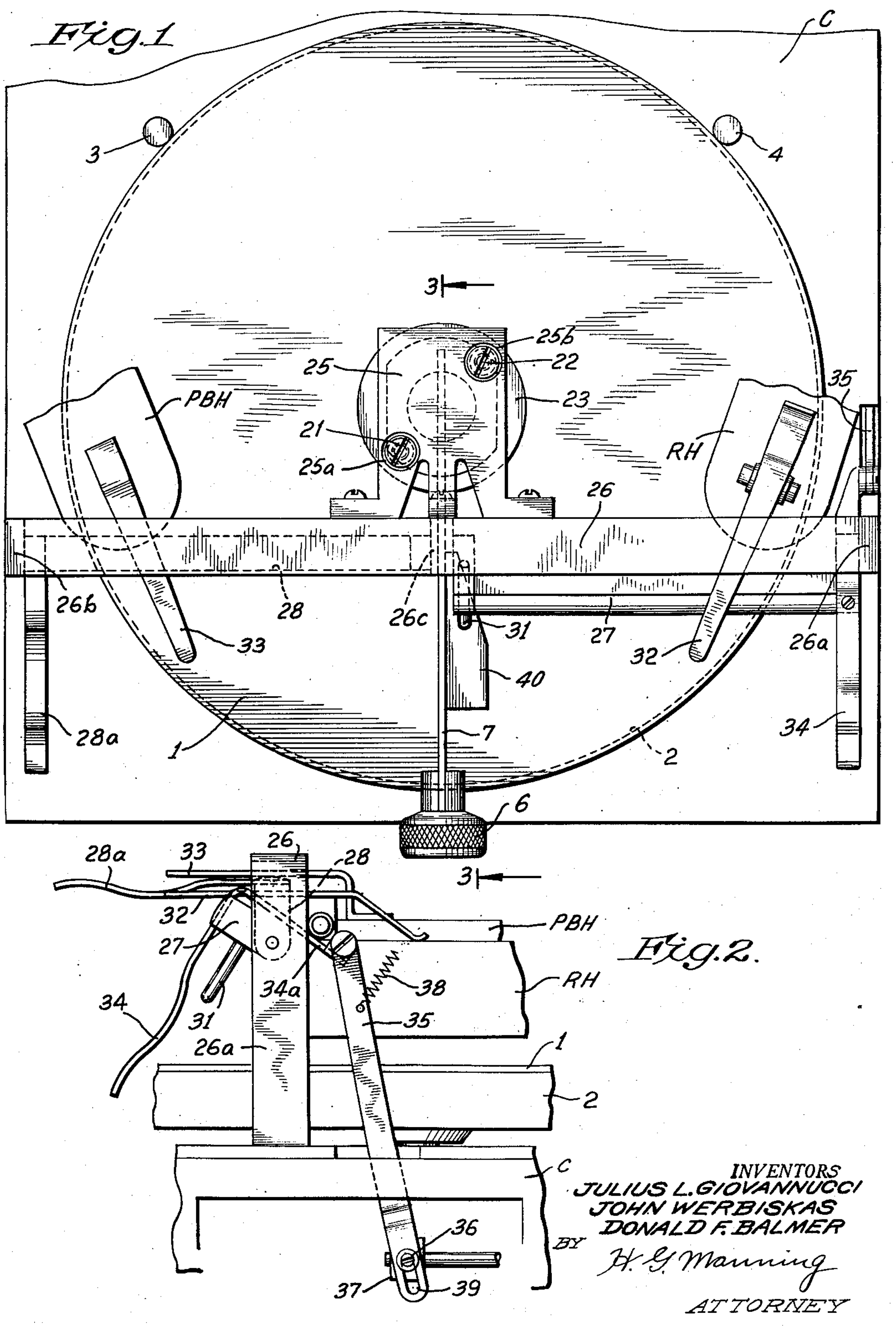
Fig. 1 represents a plan view of a dictating apparatus embodying the invention.
Fig. 2 is a fragmentary side view of the mechanism for automatically actuating the selector switch for shifting the circuit connections from recording to playback and vice versa, the view being taken from the right of Fig. 1.

Referring now to the drawings in which like reference numerals denote corresponding parts throughout the several views, the numeral 1 indicates a disk record upon which dictation or other sounds are to be recorded, said record being adapted to rest upon a thin light weight supporting shell 2 with a slight peripheral overhang.

In order to limit the rearward motion of the disk 1 on the shell 2, provision is made of a pair of vertical stop pins 3, 4 upstanding from a cabinet C.

In order to centralize the record 1 upon the turntable, the turntable shell 2 has a central cylindrical recess 5 which is adapted to be in alignment with the center hole 1*a* of the record 1 when the latter is in operating position. The shell 2 also has a central depending conical hub 2*b* having a cylindrical bearing 2*c* journaled on the upper end of a spindle S of a turntable T. To insure that the record is accurately centralized after it has first been manually placed upon the turntable shell 2, provision is made of a handle knob 6 located at the forward part of the cabinet C, as shown. The knob 6 is secured rigidly to the front end of a sliding thin cam bar 7, the intermediate portion of which passes through a flanged vertical barrel 8 which surrounds a slidable plunger 10, the latter having a horizontal roller 9 mounted in the upper end thereof—said roller being adapted to be operatively engaged by said cam bar 7, as will be hereinafter described.

The plunger 10 has a V-shaped socket 10*a* in it lower end for receiving a ball bearing 11 which rests in a similar V-shaped socket 11*a* formed in the top of a short vertical locator pin 12, which is adapted to enter the recess 5 of the turntable shell 2, previously mentioned.

The locator pin 12 is provided on its lower end with a rounded slightly enlarged point 12*a*, substantially spherical in shape, above which is a tapered conical portion 12b and a short cylindrical section 12c.

In order to loosely and yieldably mount the locator pin 12, the plunger 10 has a hollow lower end provided with a plurality of headed retaining screws 10b screwed thereinto, the inner ends of said screws 10b being loosely embraced by an annular recess 10c near the upper end of said locator pin 12.

The shell 2 has an outer vertical flange 2a loosely embracing the turntable T.

For the purpose of pressing the record 1 tightly upon the shell 2 in centralized position, provision is made of a circular ring-shaped clamping plate or shoe 13 rigidly mounted on the locator pin 12, said shoe preferably having a soft ring 14, such as neoprene, secured to the undersurface of its outer edge to provide a soft frictional engagement with the surface of the central part of the record.

Provision is also made of a similar neoprene ring 15 slightly thicker than the ring 14 and located on the turntable shell 2 under the record 1 and concentric with said ring 14.

In order to hold the clamping shoe 13 resiliently and tightly against the record 1 during the recording or reproduction thereof, provision is made of a coiled spring 16 which is housed within the upper part of the barrel 8, said spring pressing downwardly upon the plunger 10 at all times.

The rear of the cam bar 7 is provided with a widened end 7a which is adapted to engage a leaf spring member 18 to actuate a push button 17a of a turntable shell clutch-operating switch 17, whenever the cam bar is pushed to the rear.

The switch 17 is secured to a top frame, suitably mounted on the cabinet C. The leaf spring 18 has an upwardly inclined forward end 18a.

Figure 3:
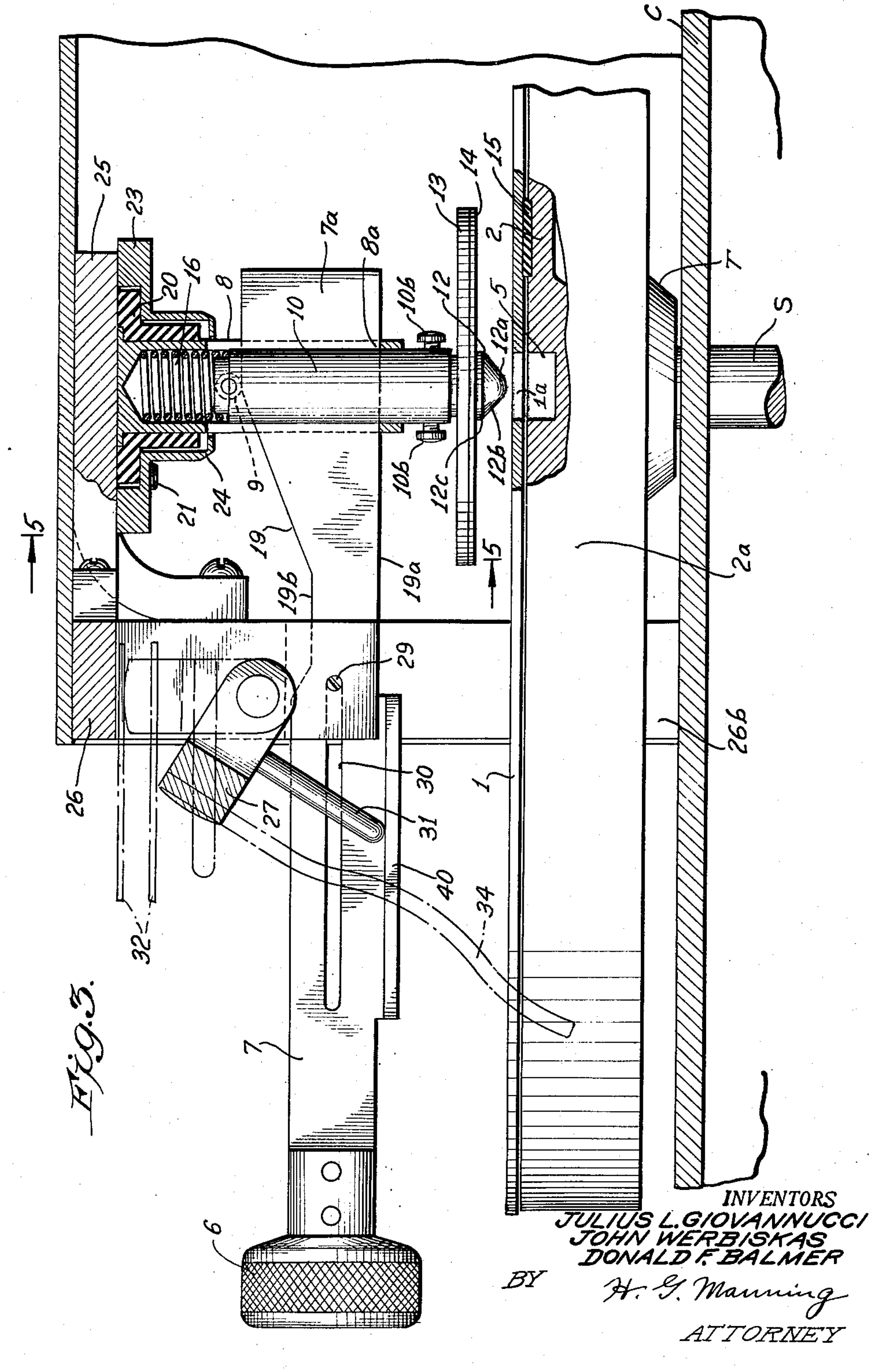
Fig. 3 is a side sectional view of the apparatus partly in section, taken on the line 3—3 of Fig. 1, looking in the direction of the arrows, and showing the record clamping plate in raised position.
Figures 4, 5:
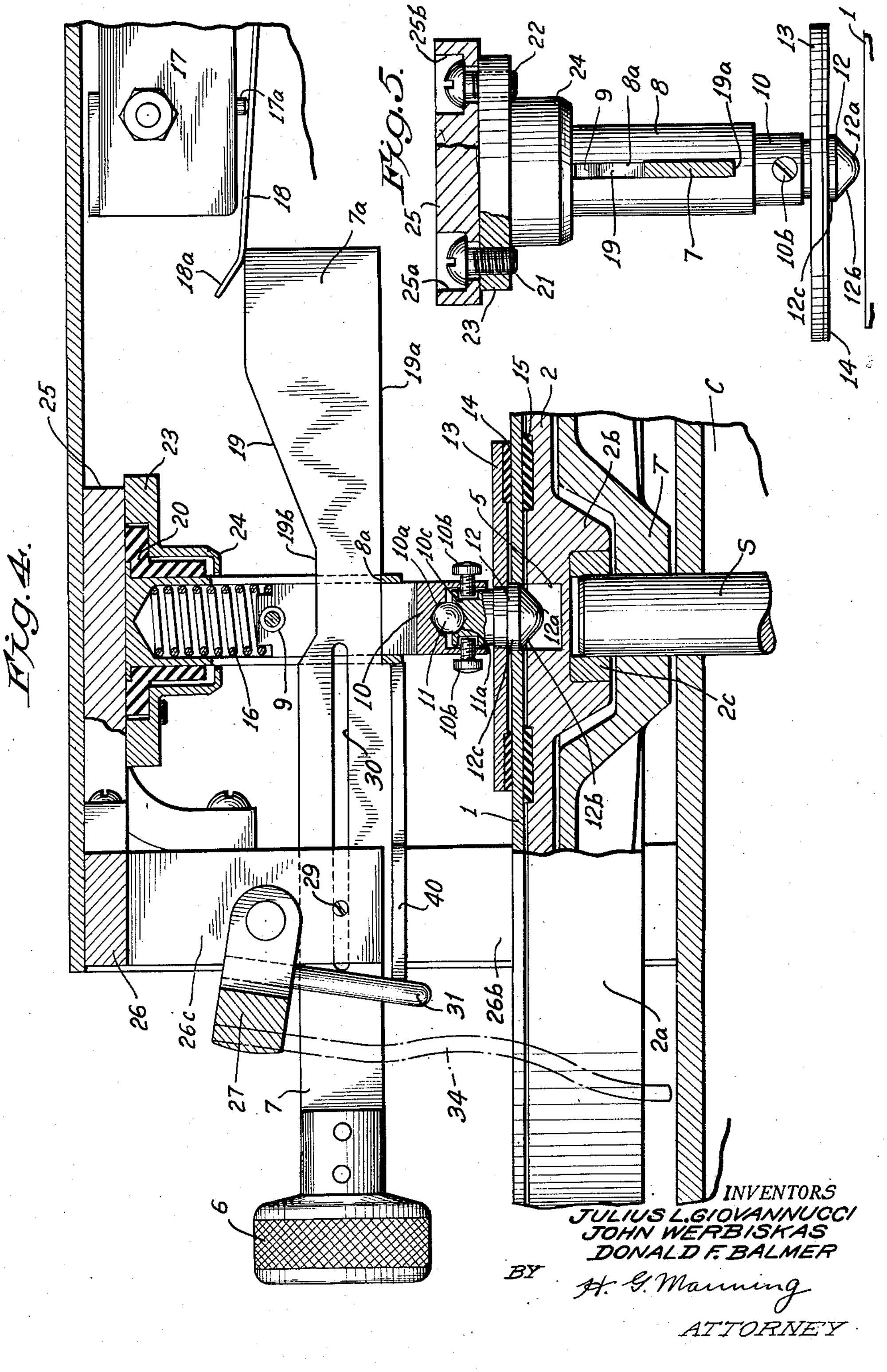
Fig. 4 is a similar side view of the same, with the record clamping plate shown lowered upon the record.
Fig. 5 is a transverse sectional view of the same, taken along the line 5—5 of Fig. 3, looking in the direction of the arrows.

The cam bar 7 is provided with an inclined intermediate upper edge section 19 near the rear thereof which serves to raise the roller 9 and the shoe 13 carried thereby from the lower record-clamping position shown in Fig. 4 to the upper position of Fig. 3, whenever the bar 7 is pulled forwardly. The bottom edge 19a of the cam bar 7 is straight and is slidable on the bottom of a slot 8a of the barrel 8 (see Fig. 5).

In case the top of the barrel 8 should be slightly out of alignment with the center of the turntable shell 2 or the recess 5 therein, this will be compensated for by means of a flexible flanged tubular neoprene grommet 20 surrounding the flanged upper end of the barrel 8, whereby said barrel 8 and the plunger 10 will be allowed to yield slightly and assume a position in alignment with the center of the recess 5.

By means of this construction, it will be seen that the clamping shoe 13 will always remain in flat contact with the disk record even though the upper end of the barrel 8 and the plunger 10 may be out of alignment with the axis of the shell recess, this action being permitted by the ball bearing 11 which allows the spring pressure to be transferred through the plunger 10 to the locating pin 11 and the clamping shoe 13.

The inclined top edge 19 of the cam bar 7 terminates in a horizontal section 19b which is adapted to be out of contact with the plunger roller 9 when the cam bar is at its rear position shown in Fig. 4. This causes the entire pressure of the coil spring 16 to be exerted against the plunger 10, which in turn is pressed downwardly against the clamp shoe 13 through the ball bearing 11 and locator pin 12. The neoprene rings 14, 15 serve to produce a uniform clamping pressure throughout the periphery of the clamping shoe 13 regardless of any dirt which might collect on the record disk 1.

In order to secure the barrel 8 and the grommet 20 to the rigid overhead bracket 25, provision is made of a pair of vertical headed screws 21, 22 driven into said bracket and located in front of and behind the barrel 8, respectively, as clearly shown in Fig. 5, said screws being connected to a horizontal metal housing 23 having a depending reduced cup-shaped lower end 24 which loosely embraces the vertical tubular portion of the grommet 20. The heads of the screws 21, 22 are seated in recesses 25a, 25b in the overhead bracket 25.

The forward end of the bracket 25 is mounted in a U-shaped bridge 26, located at right angles to the cam bar 7, and having vertical end legs 26a, 26b, and a central depending lug 26c. A pair of U-shaped clamping cams 27, 28 are pivotally mounted in said legs 26a, 26b and lug 26c, as shown. The cam 27 has a curved handle 34 which serves to raise and lower and recording head RH, while the cam 28 has a similar curved handle 28a which operates to raise and lower the playback head PBH from the record (see Fig. 1).

The depending central lug 26c carries a short horizontal headed guide pin 29 which passes through an elongated slot 30 formed in the intermediate portion of the cam bar 7. Provision is also made of a horizontal side shelf 40 below the slot 30, which is adapted to engage the lower end of a pin 31, as will be described later.

The U-shaped recording head cam 27 is provided with an inclined depending pin 31 which is adapted to lie substantially vertical when the cam bar 7 is in its rearmost position (Fig. 4), thus causing the stylus of the recording head RH to rest upon the disk record 1.

To facilitate the manipulation of the recording head RH and playback head PBH, said heads have tapered lifting handles 32, 33 at their forward ends, respectively. The handles 32, 33 are located between the top bar of the U-shaped bridge 26 and the upper bars of the U-shaped head operating cams 27, 28, respectively (see Figs. 3 and 4).

Moreover, the recording head operating cam handle 34 has a depending arm 34a connected by a depending link 35 to a pin 36 mounted on a recording-playback selector switch 37. The link 35 is biased upwardly by an inclined helical spring 38, and said link 35 has an elongated slot 39 at its lower end in which the pin 36 is slidably fitted with a small backlash. This construction was fully described and claimed in a prior application of Julius L. Giovannucci, Serial No. 564,054, filed November 18, 1944, entitled Sound Recording and Reproducing Apparatuses, now Patent No. 2,506,665, issued May 9, 1950.

*Operation*

In operation, assuming that the parts of the apparatus are in the recording position shown in Fig. 4, the rear section 7a of the cam bar 7 will hold the leaf spring 18 upwardly against the push button 17a to maintain the circuit of the turntable shell brake clutch switch 17 closed. The construction of such a clutch and the circuit connections thereof were fully disclosed in a copending application of Theodore H. Nakken, filed June 19, 1944, Serial Number 540,929, and entitled "Rapid Start and Stop Clutch Mechanism for Phonographs," patented May 18, 1948, No. 2,441,836. When the operator is through recording and desires to reverse or remove the disk 1 from the turntable, it will only be necessary for him to pull the handle knob 6 forwardly to the position shown in Fig. 3, causing the widened rear end 7a to leave the leaf spring 18 and allow the switch 17 to open, which will cause the turntable shell 2 to stop rotating.

The forward movement of the cam bar 7 will also cause the inclined section 19 to lift the roller 9 and compress the spring 16, as shown in Fig. 3. The shelf 40 will at the same time be caused to engage the inclined pin 31. The recording head clamping cam 27 will thus be automatically lifted to raised position. The top bar of the cam 27 will also be caused to clamp the handle 32 of the recording head RH against the bridge 26, and the recording arm will stop feeding. When the head clamping cam 27 is raised, the link 35 will be depressed against the pin 36 to shift the selector switch from recording to playback operation.

When it is desired to again record on the disk record, the cam bar 7 will be pushed inwardly, after which the arm 34 of the U-shaped cam bar 27 will be manually depressed to the position of Fig. 4 to lower the recording head RH upon the record.

With the parts in the position shown in Fig. 3, if it is desired to reproduce a record, the cam bar 7 will be first pushed inwardly as before, but in this case, the handle 28a of the U-shaped cam 28 will be manually swung downwardly causing the playback head PBH to be placed upon the record.

It will be understood that when the cam bar 7 is in the forward position shown in Fig. 3, with the roller 9 and the plunger 10 lifted within the barrel 8 by the inclined edge 19 of the cam, the spring 16 will be compressed. The locating pin 12 will then be held in the "up" position shown in Fig. 3, permitting the record to be moved manually into approximately central position.

When the cam bar 7 is thereafter moved rearwardly, the plunger 10 will be lowered automatically by means of the pressure of the coiled spring 16, and the roller 9 will move downwardly over the inclined edge 19 causing the central locator pin 12 to also be depressed until its spherical point 12a enters the center hole 1a of the disk.

As the pin drops still farther down, its conical section 12b will cause the record disk to move to bring the hole 1a in the record directly over the shell recess 5. Finally, when the cylindrical section 12b of the locator pin 12 passes through the disk 1 and the shell 2, and enters the turntable recess, the record will be accurately centered with respect to the turntable 2, and will be clamped automatically in this position by the pressure of the spring 16 exerted through the clamping plate 13, as long as desired.

While there has been disclosed in this specification one form in which the invention may be embodied, it is to be understood that this form is shown for the purpose of illustration only, and that the invention is not to be limited to the specific disclosure, but may be modified and embodied in various other forms without departing from its spirit. In short, the invention includes all the modifications and embodiments coming within the scope of the following claims.

Having thus fully described the invention, what is claimed as new, and for which it is desired to secure Letters Patent, is:

1. In an apparatus for positioning an apertured disk record upon a rotating turntable having a central recess, a vertical locator pin having lateral flexibility initially located above said record, and manually-controlled cam-operated means embracing said locator pin to depress said pin through the aperture in said record and against the periphery of said central recess to accurately hold said record concentric with said turntable.

2. In an apparatus for accurately locating an apertured disk record upon a rotating support having a central recess, a frame, a vertical locator pin carried by said frame and initially positioned above said record, spring means to press said locator pin downwardly through the aperture in said record and into said recess, and manually-controlled horizontally-movable cam means mounted on said frame to initially hold said pin upwardly out of said record and said recess against the action of said spring means.

3. In an apparatus for locating an apertured disk record upon a rotating support having a central recess, an upper frame, a depending vertical barrel yieldably connected to said frame, a spring-pressed plunger located in said barrel, a locator pin connected to the lower end of said plunger, and horizontal slidable cam means passing through said barrel to initially hold said plunger and pin upwardly against the action of said spring.

4. The invention defined in claim 3, in which said cam comprises an elongated substantially horizontal bar having a handle knob on its forward end for convenience in manipulation.

5. The invention defined in claim 3, in which said locator pin is provided with a ball thrust connection with the lower end of said plunger.

6. In an apparatus for locating an apertured disk record upon a rotating support having a central recess, an upper frame, a barrel connected to said frame, a spring-pressed plunger located in said barrel, a locator pin connected to the lower end of said plunger, horizontal reciprocating cam means passing through said barrel to initially hold said plunger and pin upwardly against the action of said spring, a continuously rotating turntable, a shell for supporting said record embracing said turntable, means for clutching said shell to said turntable, and means at the rear end of said cam to close a switch for operating said clutching means.

7. The invention defined in claim 6, having a recording head lifting cam mounted in said frame, switch means for shifting said apparatus for recording or reproducing, selectively, a shelf on said cam bar to engage said recording head lifting cam to simultaneously raise said recording head from said record and shift said switch from recording to playback position.

8. The invention defined in claim 3, in which said locator pin has a spherical point, a conical intermediate section, and a cylindrical top section.

9. The invention defined in claim 6, in which said turntable shell clutch is operated by a pushbutton switch, and a resilient leaf spring connected to said switch and engageable by the rear end of said cam bar to operate the pushbutton of said switch.

10. The invention defined in claim 3, in which provision is made of a recording head and a vertically swingable U-shaped recording head lifting cam pivotally mounted on said frame, said recording head having a forwardly-extending lifting handle extending above said U-shaped cam, said cam means and said U-shaped cam having interengageable means for upwardly swinging said U-shaped cam when said cam means is pulled forwardly whereby said lifting handle may be raised.

11. In an apparatus for locating an apertured disk record upon a rotating support having a central recess, a cabinet, an upper frame upon said cabinet, a depending vertical barrel yieldingly connected to said frame, a spring-pressed plunger located in said barrel, a locator pin connected to the lower end of said plunger, and cam means to initially hold said plunger and pin upwardly against the action of said spring, said cam means comprising a substantially horizontal elongated bar provided with a longitudinal slot, and said frame having a guide pin passing through said slot to hold said cam bar in horizontal position and limit the reciprocation thereof.

12. In an apparatus for locating an apertured disk record upon a rotating support having a central recess, a cabinet, an upper frame upon said cabinet, a depending vertical barrel yieldingly connected to said frame, a spring-pressed plunger located in said barrel, a locator pin connected to the lower end of said plunger, and cam means to initially hold said plunger and pin upwardly against the action of said spring, said cam means comprising a substantially horizontal elongated bar having an inclined rear upper edge for engaging and raising said plunger when said cam bar is pulled forwardly.

13. In an apparatus for locating an apertured disk record upon a rotating support having a central recess, a cabinet, an upper frame on said cabinet, a depending vertical barrel yieldably connected to said frame, a spring-pressed plunger located in said barrel, a locator pin connected to the lower end of said plunger, and cam means to initially hold said plunger and pin upwardly against the action of said spring, said cam comprising an elongated bar passing through said plunger, said plunger being provided with a roller and said bar being provided with an inclined upper edge for engaging said roller to lift said plunger and locator pin upwardly when said bar is pulled forwardly.

14. In an apparatus for locating an apertured disk record upon a rotating support having a central recess, a cabinet, an upper frame on said cabinet, a depending vertical barrel yieldably connected to said frame, a spring-pressed plunger located in said barrel, a locator pin connected to the lower end of said plunger, and cam means to initially hold said plunger and pin upwardly against the action of said spring, said cam comprising an elongated bar passing through said plunger and said barrel and plunger being provided with slots passing therethrough which are adapted to embrace said cam bar and permit the latter to be reciprocated within said barrel and plunger.

JULIUS L. GIOVANNUCCI.
JOHN WERBISKAS.
DONALD F. BALMER.

REFERENCES CITED

The following references are of record in the file of this patent:

UNITED STATES PATENTS

| Number | Name | Date |
|---|---|---|
| Re. 22,551 | Andrews | Oct. 3, 1944 |
| 1,868,846 | Oyston | July 26, 1932 |
| 2,135,035 | Heacock | Nov. 1, 1938 |
| 2,293,219 | Rieber | Aug. 18, 1942 |
| 2,323,365 | Andrews | July 6, 1943 |
| 2,340,418 | Gabel | Feb. 1, 1944 |
| 2,380,727 | Dann | July 31, 1945 |

FOREIGN PATENTS

| Number | Country | Date |
|---|---|---|
| 539,492 | Great Britain | Sept. 12, 1941 |